United States Patent [19]

von der Becke et al.

[11] Patent Number: 5,427,014
[45] Date of Patent: Jun. 27, 1995

[54] COOKING VESSEL

[75] Inventors: Reinhard von der Becke, Zumikon; Hans-Jurgen Beck, Baar, both of Switzerland

[73] Assignee: AMC International Alfa Metalcraft Corporation AG, Switzerland

[21] Appl. No.: 256,956

[22] PCT Filed: Dec. 2, 1993

[86] PCT No.: PCT/CH93/00271
§ 371 Date: Jul. 27, 1994
§ 102(e) Date: Jul. 27, 1994

[87] PCT Pub. No.: WO94/13183
PCT Pub. Date: Jun. 23, 1994

[30] Foreign Application Priority Data

Dec. 4, 1992 [CH] Switzerland ............ 3730/92

[51] Int. Cl.6 .............. A47J 27/08; A47J 27/09; B65D 45/00; B65D 45/34
[52] U.S. Cl. ................. 99/337; 99/403; 220/316; 220/325
[58] Field of Search ............ 99/330, 337, 338, 342, 99/403, 410–417, 340, 449; 220/316, 325, 912; 126/377; 292/256

[56] References Cited

U.S. PATENT DOCUMENTS

| | | | |
|---|---|---|---|
| 1,208,041 | 12/1916 | Steere | 220/316 |
| 1,439,000 | 12/1922 | Jacobs | 220/325 |
| 1,784,480 | 12/1930 | Beyer | 220/325 |
| 2,778,736 | 1/1957 | Wagner | 99/403 |
| 2,906,191 | 9/1959 | Lee, Sr. | 99/342 |
| 4,229,331 | 11/1981 | Bertola | 220/316 |
| 4,313,371 | 2/1982 | Jackson et al. | 99/403 |
| 4,330,069 | 5/1982 | Bauer | 220/316 |
| 4,470,515 | 9/1984 | Boehm | 220/316 |
| 4,711,366 | 12/1987 | Chen | 99/337 |
| 4,733,795 | 3/1988 | Boehm | 220/316 |
| 4,932,550 | 6/1990 | Moucha | 99/403 |

FOREIGN PATENT DOCUMENTS

1142648 9/1957 France.
4017067 11/1991 Germany.
904110 8/1962 United Kingdom.

*Primary Examiner*—Timothy F. Simone
*Attorney, Agent, or Firm*—Webb Ziesenheim Bruening Logsdon, Orkin & Hanson

[57] ABSTRACT

The cooking vessel comprises a container (1) and a lid consisting of an inner lid (3) and an outer lid (5). The container comprises a bent peripheral container rim (2) wherein twelve individual hook-like lock elements (21) are effective locking the cooking vessel. The lock elements (21) are arranged peripherically and swivellingly along the inner lid rim (4) so that through pressing the upper lid (5) against the lock elements (21) a swivel movement of said lock elements is obtained. The lock elements are C-shaped with a hook part (32), such that in the swivel position corresponding to the closed state, the ends of this hook part (32) grip under the outer container rim (2). In the swivel position corresponding to the opened state, the ends of said hook part (32) are in a distance from said container rim (2) allowing an unhindered lifting of the inner lid (3) from the container (1).

10 Claims, 9 Drawing Sheets

COOKING VESSEL

BACKGROUND OF THE INVENTION

1. Field of the Invention

The present invention relates to cooking vessels.

2. Background Art

The handling of cooking vessels is considered very often as somewhat inconvenient. Thus, it is an object of this invention to provide a cooking vessel of this kind which is especially easy to handle.

SUMMARY OF THE INVENTION

Accordingly, we have developed a cooking vessel which includes a container and a lid having an inner lid part and an upper lid part. The container includes a bent peripheral container rim and the lid includes at least three single lock elements peripherally arranged around the rim of the inner part which are swivellingly deposed and serve for locking the cooking vessel. The rim area of the upper lid part is shaped to produce a swivel movement of the lock elements by pushing the upper lid part against them. The lock elements are supported at the outer rim of the inner lid part in such a way that the lock elements, in the swivel position corresponding to the closed state, press with ends from the outside against the container rim. In the swivel position corresponding to the open state, the ends of the lock elements are at a distance from the container rim such that an unhindered lifting of the inner lid part from the container is possible. The lock elements, in a cross-section perpendicular to their axis of rotation, are formed approximately C-shaped, with an increasing wall width in the upper left hand C-area and with a tapered hook-like part in the lower right hand C-area.

BRIEF DESCRIPTION OF THE DRAWINGS

The invention is described below in detail by examples with the help of drawings, wherein.

DESCRIPTION OF THE PREFERRED EMBODIMENTS

Figure 1:
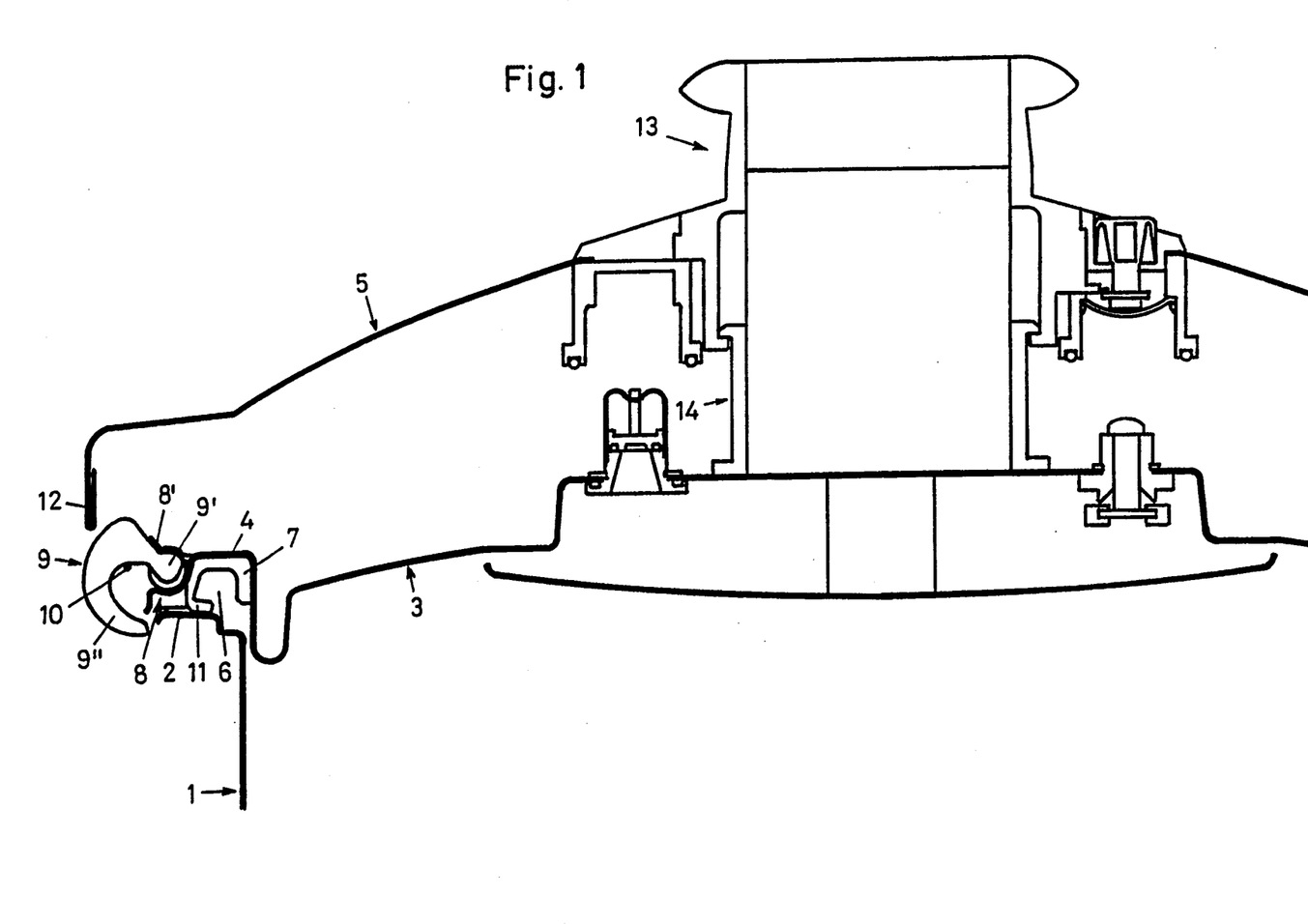
FIG. 1 is a schematic partial representation in a cross section along an axis of symmetry of a first embodiment of a cooking vessel according to the invention having a lock element in an open position.

The cooking vessel shown in FIG. 1 comprises a container 1 having a bent peripheral container rim 2, an inner lid 3 having an inner lid rim 4, and an upper lid 5. The inner lid 3 together with the upper lid 5, also called outer lid, forms the actual lid. The inner lid rim 4 is canal-like bent to form a canal 6 for the reception of a preferably C-shaped seal 7. The outer edge of the canal 6 is laterally and below outwardly rounded to form a lower bearing 8 for each of the lock elements 9 (FIG. 1). At the inner lid rim 4 are in each case formed tongues 8' by two parallel incisions at the outer part of the inner lid rim, which are bent upwards to form the upper part of the bearing for the individual lock elements 9. Such lock elements are distributed all around the inner lid rim 4. A lock element 9 of this kind comprises a bearing head 9' and a hook part 9". Thus, the lock elements are pivotally arranged at the inner lid 3. The lock elements are always pressed from below towards the top against the upper lid 5 by a peripheral spring 10. The upper lid 5, however, can be removed from the inner lid 3.

Figure 2:
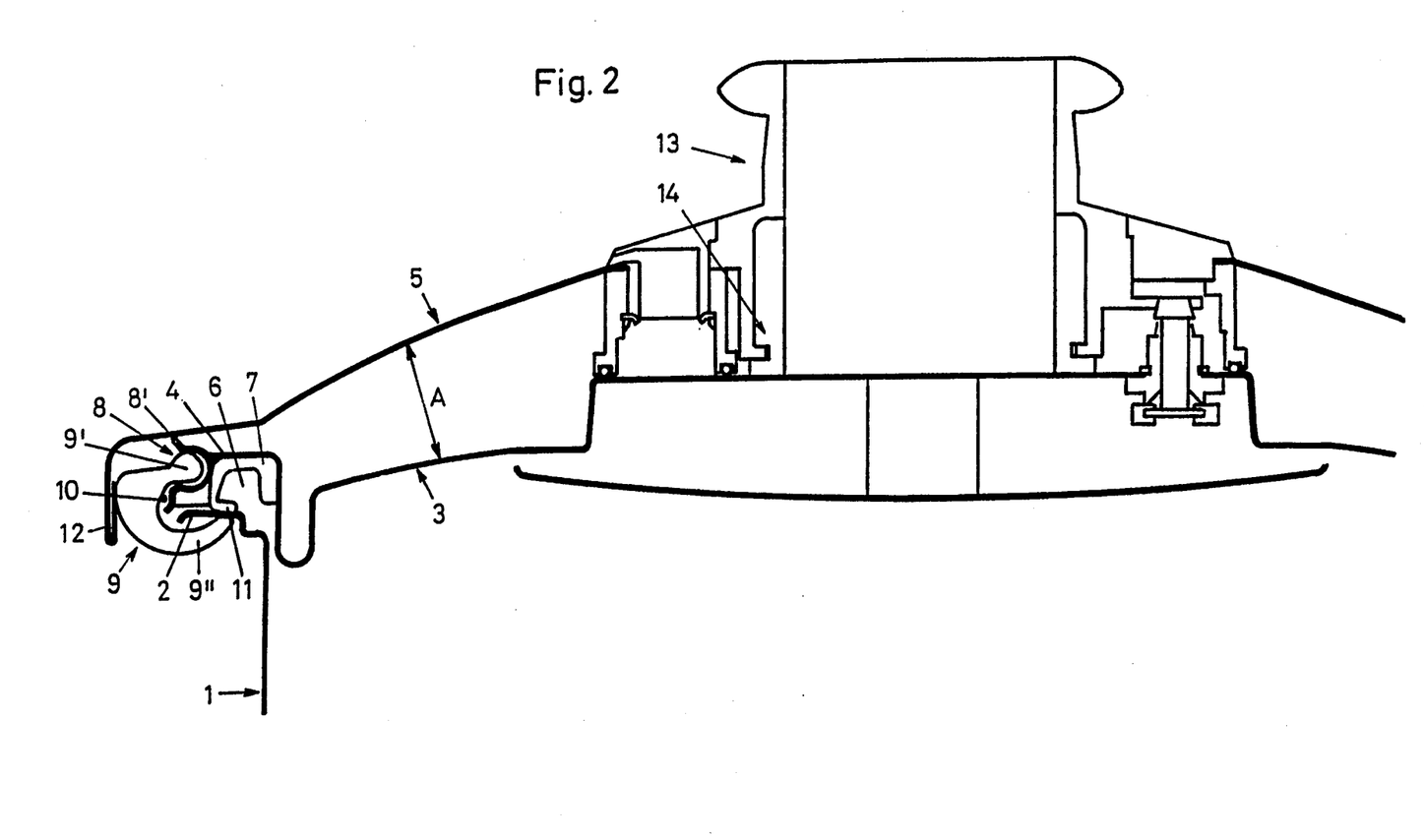
FIG. 2 is a schematic partial representation of the embodiment shown in FIG. 1 having the lock element in a closed position.
Figure 7:
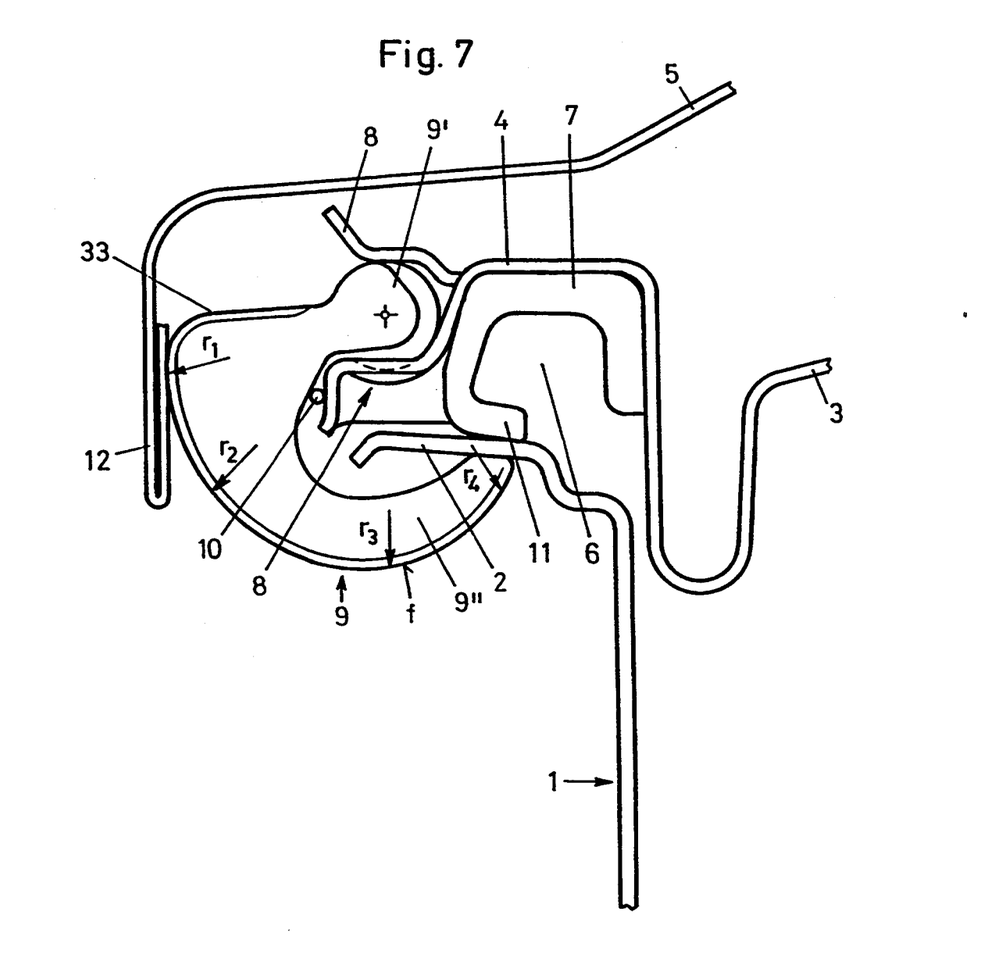
FIG. 7 is a detail representation in a side view of the lock element shown in FIG. 1.

FIG. 2 shows the lid in its closed position. The lock element 9 is folded underneath the container rim in such a way that it is pressed from below by the end of the hook part 9" against a lip 11 of the seal 7 (FIG. 7). The average distance A between inner lid 3 and outer lid 5 is smallest in this closed lid position. The outer rim 12 of the outer lid 5 in FIG. 2 is, for example, arranged as a cylindric surface which is coaxial to the axis of symmetry of the container. Generally, this surface can also be of conical shape.

Figure 3:
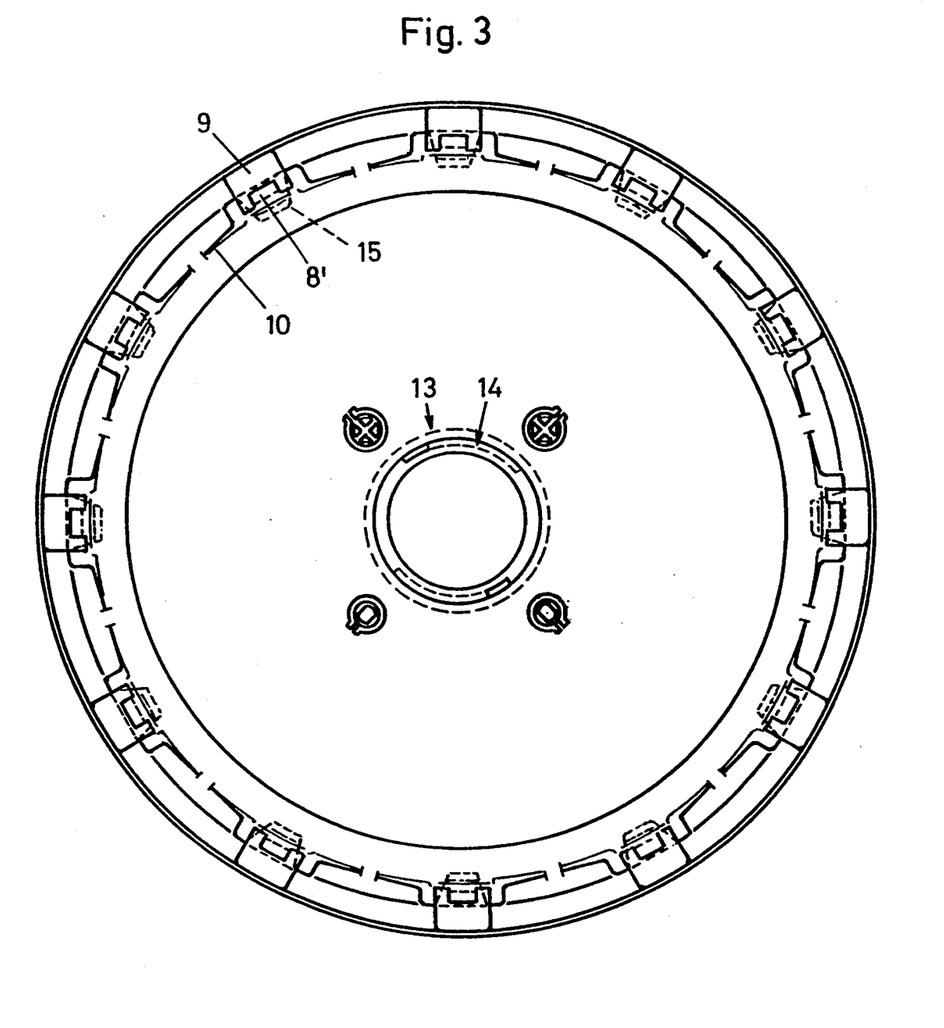
FIG. 3 is a schematic partial representation of the embodiment shown in FIG. 1 along a plane perpendicular to the axis of symmetry.
Figure 4:
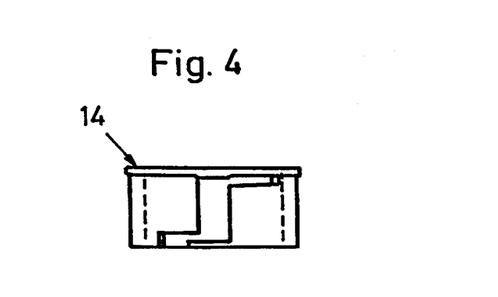
FIG. 4 shows a schematic representation of a detail of a bayonet catch for the outer lid of the cooking vessel shown in FIG. 1.

FIGS. 1 to 3 demonstrate that the outer lid 5 may have a lid knob 13, which is boltable in the center by a bayonet catch 14 (FIG. 4). In the example according to FIG. 3 twelve lock elements, like the lock element 9, are arranged in equal distances along the rim of the inner lid 3. Preferably, between ten and twenty lock elements can be mounted. The lock elements are pressed against the top by the spring 10. FIG. 4 shows a detail of the bayonet catch 14.

Figure 5:
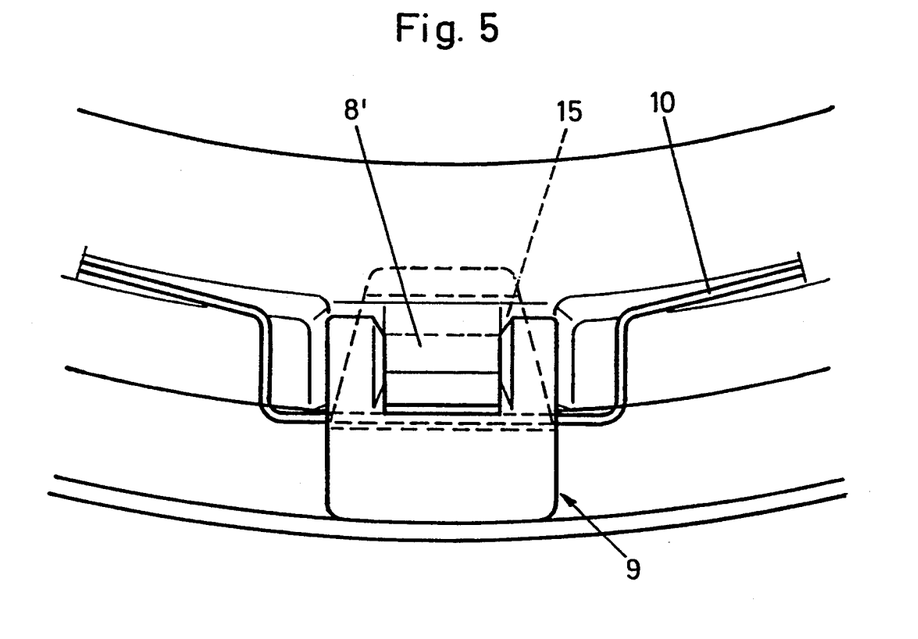
FIG. 5 is a schematic representation from above of a lock element for the cooking vessel shown in FIG. 1 in the assembled state.
Figure 6:
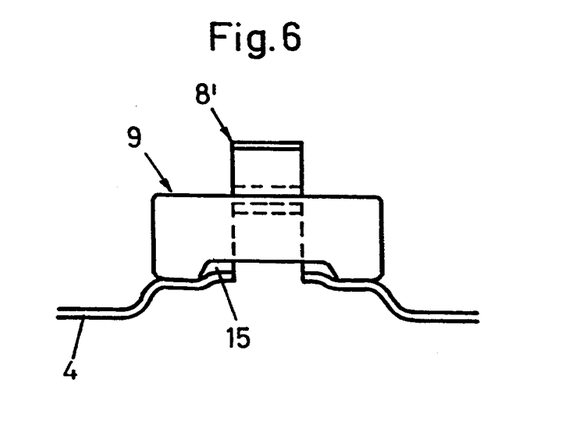
FIG. 6 is a schematic representation of the lock element in FIG. 1 and located in the area of a tongue of the inner lid rim.

FIGS. 3, 5 and 6 demonstrate that the lock elements 9 have a depression 15 in the area of the axis of rotation, which is slightly broader than the width of the tongues 8', so that each lock element 9 remains clamped by such a tongue 8'.

The lock element 9 is approximately C-shaped in a cross-section perpendicular to its axis of rotation, but has an increasing wall width in its upper left area. The outer downward oriented border of the lock element is a curve f, which can be expressed in polar coordinates by the formula $f=F(r,w)$, wherein r is the distance of a point of the curve f from the theoretical axis of rotation and w is the angle which includes the distance straight line r with the horizontal x axis. In the example according to FIG. 2 with the lock element in the closed position the values of $r_1$ for $w_1 \approx 190°$, $r_2$ for $w_2=225°$, $r_3$ for $w_3=270°$ and $r_4$ for $w_4 \approx 300°$ should be selected in such a way that $r_1 < r_2$ and preferably $r_3 \approx r_2$ and $r_4 < r_1$ (FIG. 7).

The cooking vessel with the lock elements according to FIGS. 1 and 2 functions as follows:

During the pressure build-up in the cooking vessel in the closed position the lock elements 9 are pressed around their axis of rotation towards the top, however, since the outer lid 5 is tightly locked to the inner lid 3 (FIG. 2), an opening of the cooking vessel is prevented by form fitting. The form fitting, which guaranties the counterforce by the outer lid 5, is given in the embodiment according to FIGS. 1 or 2, in that the swivel movement of the lock elements 9 is hampered by the bent rim of the outer lid 5.

Figure 8:
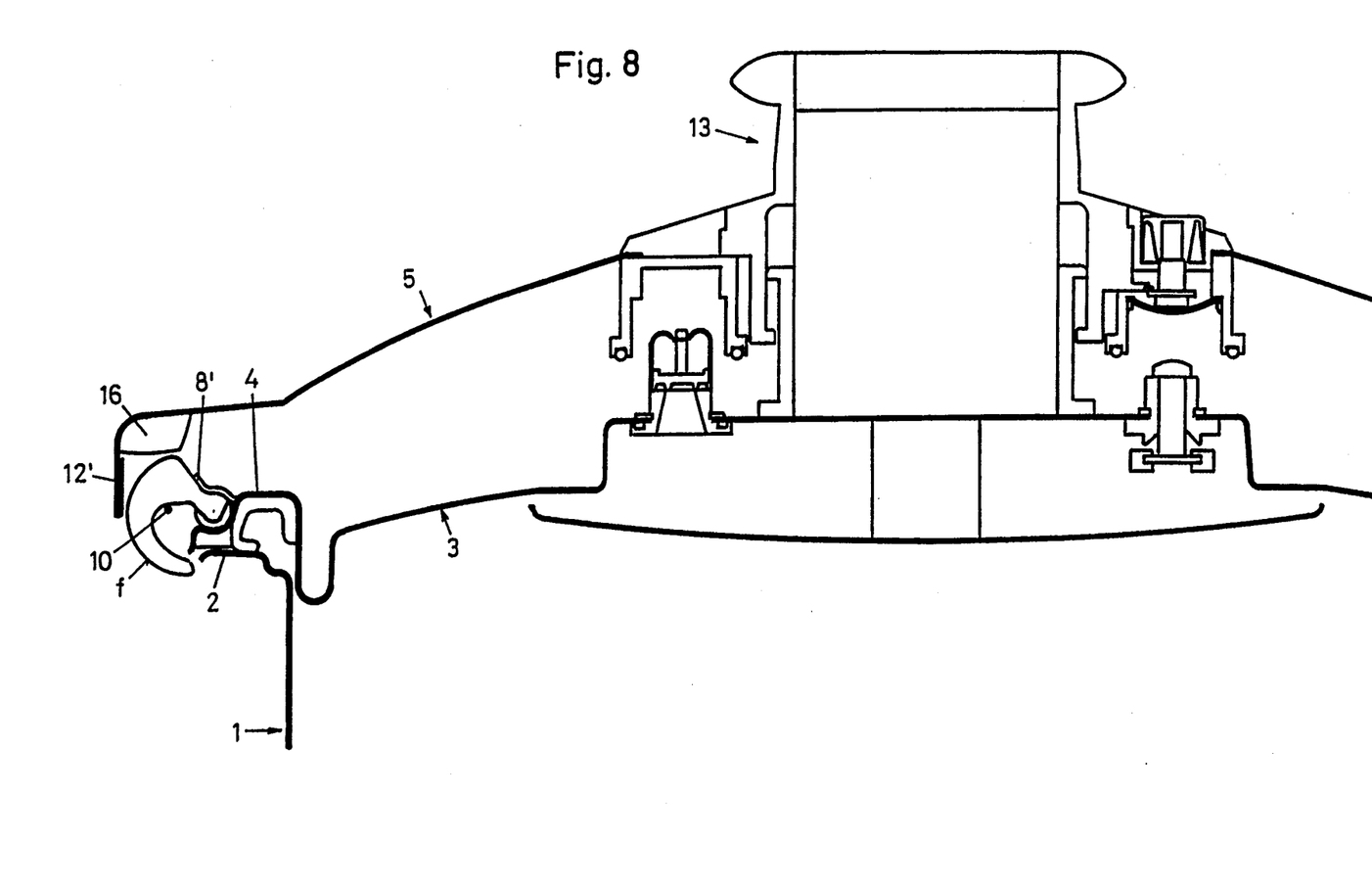
FIG. 8 is a schematic partial representation in a cross section along an axis of symmetry of a second embodiment of a cooking vessel according to the invention having a lock element in an open position.
Figure 9:
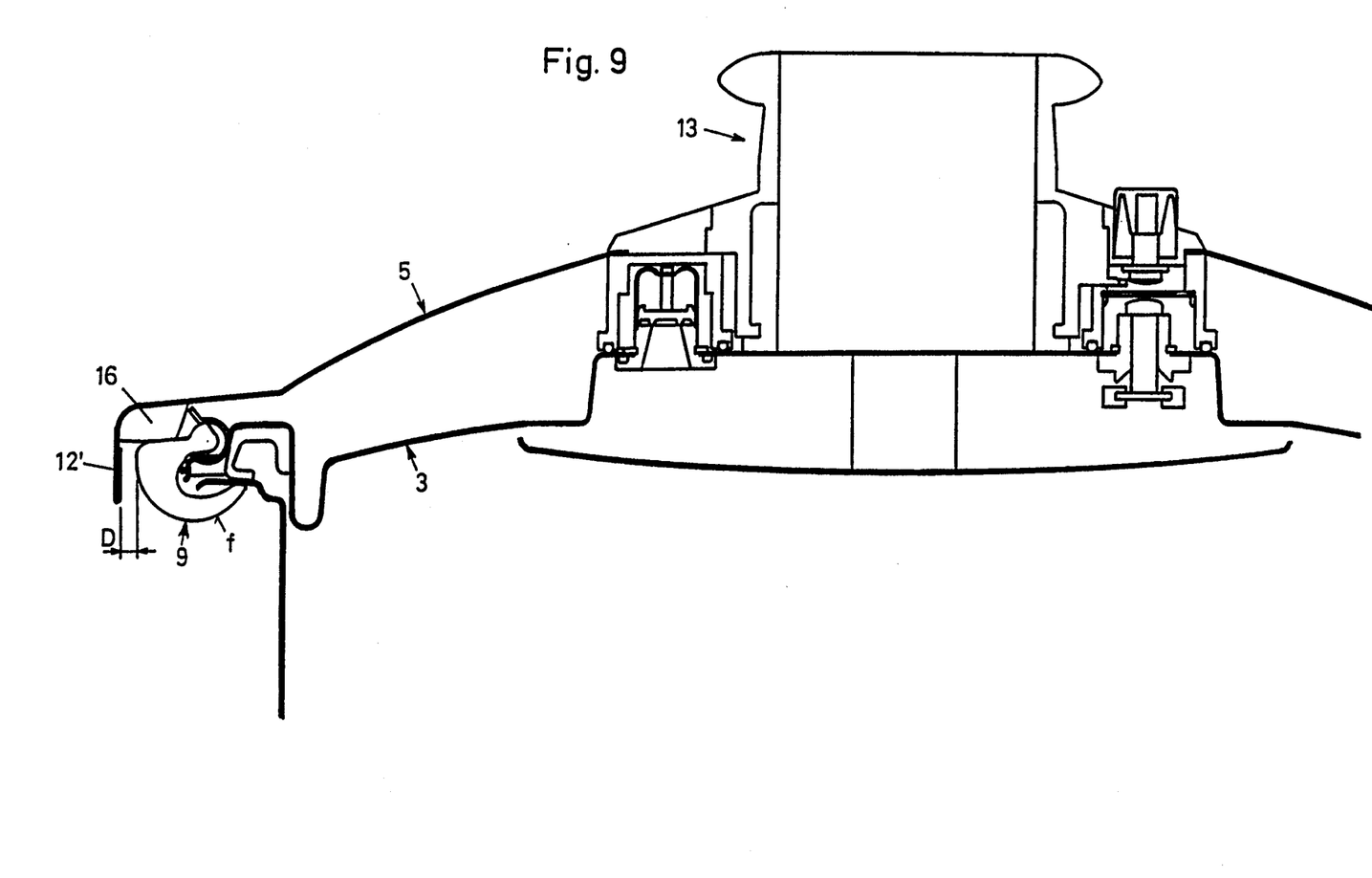
FIG. 9 is a schematic partial representation of the embodiment shown in FIG. 8 with the lock element in a closed position.
Figure 10:
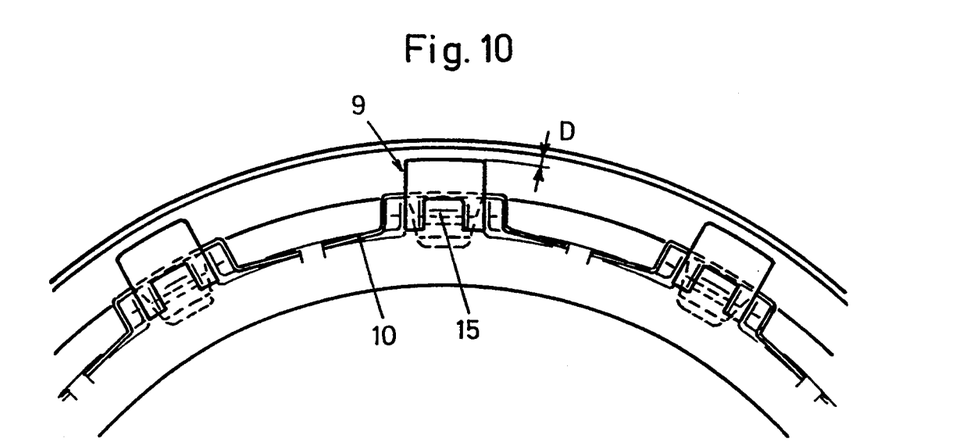
FIG. 10 is a schematic partial representation of the embodiment shown in FIG. 8 along a plane perpendicular to the axis of symmetry.

In the embodiment according to FIG. 8 or 9 the lock elements 9 are hindered from an upward swivel movement by a stop 16, so that between the outer lid rim 12' and the lock element 9 in the closed position an air gap may occur having a width of D.

In both cases the outer lid exerts the counterforce which holds the lock elements 9 in position. In the embodiment according to FIGS. 1 and 2 the above-mentioned condition ($r_1 < r_2$) with regard to the distances or radius $r_1$ or $r_2$ must be fulfilled, as shown by comparison of FIGS. 1 and 2. In the embodiment according to FIGS. 8 and 9 the curve f may, for example, also be a half circle.

In order to open the cooking vessel the central lock system is moved by turning to the start position after the pressure decreases and the outer lid 5 at the swivel knob 13 is lifted for about 20 to 30 mm. Because of its own weight the inner lid 3 remains on the cooking vessel. The peripheral spring 10 below the lock elements 9 pushes said lock elements upwards against the end of the tongues 8', which in each case serves as stop. The form fitting with the cooking vessel is removed by the swivel movement of the lock elements and the lid can be lifted off.

To close the cooking vessel the lock elements 9 are swung under the container rim 2 by the outer lid 5 and the stops 16 respectively. Subsequently the lid knob 13 is turned and the central lock system closes the outer lid 5 with the inner lid 3.

To guarantee a thorough cleaning of the lid, the outer lid 5 can be removed from the inner lid 3. For this purpose the lid knob 13 is turned into the appropriate position in which the bayonet catch of the central lock is open. Because there are no fixed connecting elements between the inner and outer lid, a complete cleaning of both parts is made easier.

Because the lock elements 9 grip under the container rim, the bending moment on the bent rim 2 of the container is minimized.

Only very little strength is necessary to close the lid. With the correct setting of the spring 10 to lift up the lock elements 9 the own weight of the outer lid 5 is already sufficient to close these elements. If the lifting up of the lock elements 9 is done by the outer bent rim 12 of the outer lid 5, an additional locking is in fact not necessary. If the form of the lock element is optimal, an independent opening of this embodiment is not possible any longer. The additional locking via the central swivel knob 13 is intended to give the user a feeling of safety.

FIGS. 3 and 7 show, as the axes of rotation of the lock elements 9 run tangential along the container rim, that the length of the lock elements 9 is preferably only a little longer than the above-defined radius r. The hook-like ends 9'' (FIG. 7) of the lock elements and the ends of the hooks or hook parts 9'' (FIG. 7) may be a little smaller, for example of conical or slightly tapered shape, in order to grip better under the round container rim 2.

As is for example clearly shown in FIG. 5, the lock elements are preferably not exactly cylindrical. In particular, they may have an outer radius which corresponds to the inner radius of the lid rim 12 (FIG. 2), and an inner radius of the hook part 9'', which corresponds to the outer radius of the cooking vessel's rim.

Figure 11:
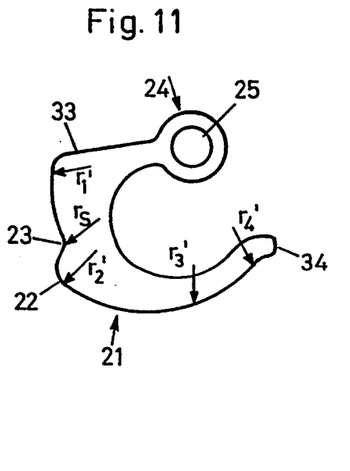
FIG. 11 is a side view of a further embodiment of a lock element according to the invention and having a shoulder and a recess.
Figure 12:
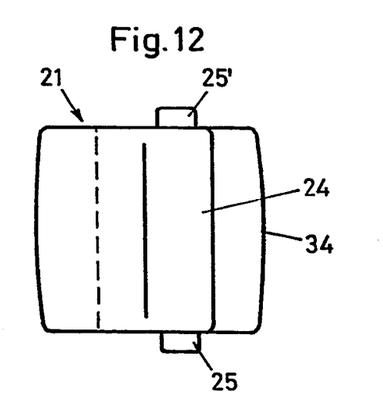
FIG. 12 is a top view of the lock element according to FIG. 11, the bearing head of which is provided with two disk-like axially arranged extensions.

The respective values for the lock element 21 according to FIGS. 11 and 12, which is shown in a position corresponding to the closed position, are:

$R_1'$ for $w_1 \approx 190°$, $r_s$ for $w_s=215° \pm 10°$, $r_2'$ for $w_2=225°$, $r_3'$ for $w_3=270°$, and $r_4'$ for $w_4 \approx 300°$, so that $r_1' < r_2'$, $r_3' < r_2'$ and $r_s < r_2'$.

Therefore, the lock element 21 shows a shoulder 22 in the end area of the radius $r_2'$ and a recess 23 in the end area of radius $r_s$.

The bearing head 24 of the lock element 21 according to FIGS. 11 and 12 may have two burl or disk-like or cylindrical extensions 25, 25' to ease the bearing.

Figure 13:
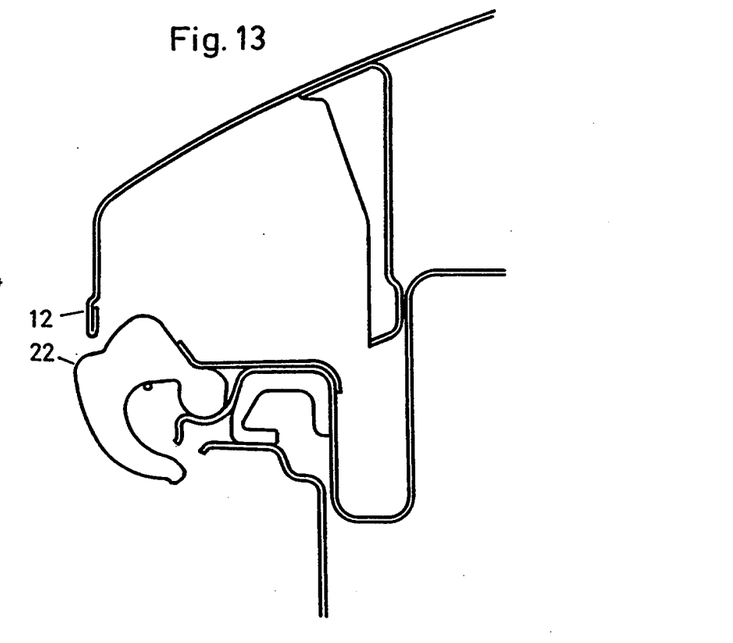
FIG. 13 is a schematic partial representation of a cooking vessel having a lock element according to FIG. 11 in an open position.

FIG. 13 shows the lock element in the opened position in which the lid rim 12 can press against the shoulder 22.

Figure 14:
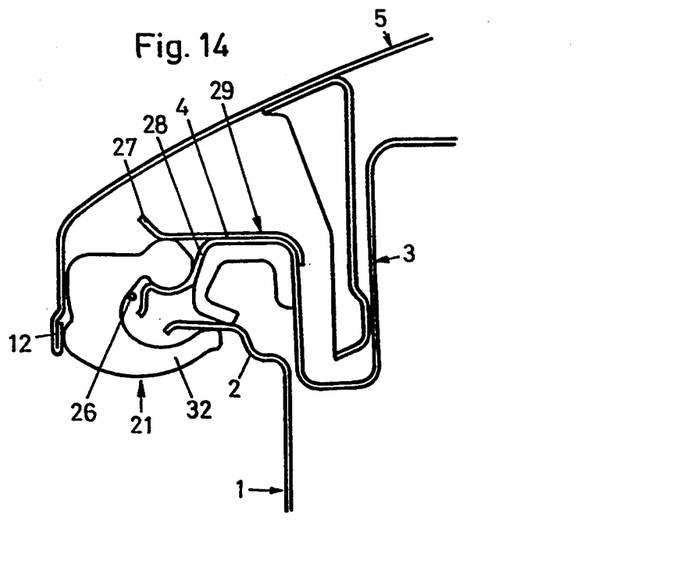
FIG. 14 is a schematic partial representation of a cooking vessel having a lock element according to FIG. 11 in a closed position.

FIG. 14 shows the lock element in the closed position with two tangential points of contact between the lock element and the lid rim 12. In this position the spring 26 is pressed downwards. The tongue 27, which corresponds to the tongue 8' shown in FIG. 7, is located in an independent part 29 connected to the lower holder 28.

Figure 15:
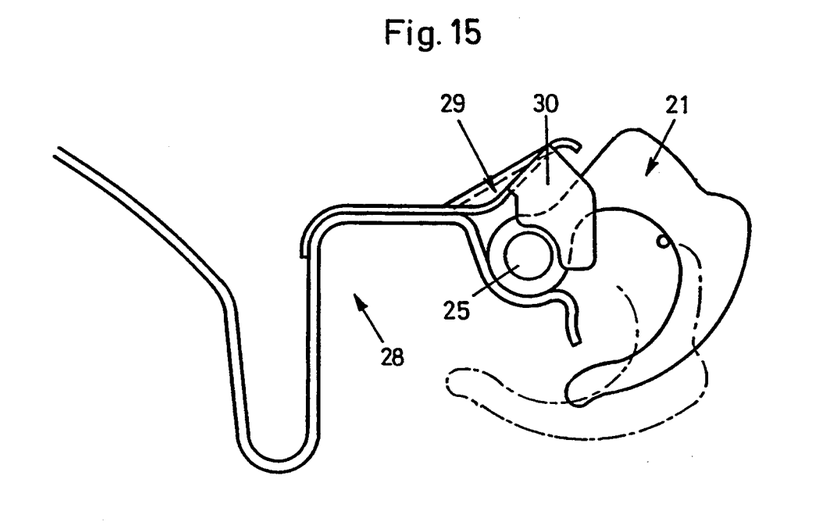
FIG. 15 is a detail representation of a bearing part having bent lobes provided with a round recess for a lateral fixation of such a disk-like extension of the lock element according to FIG. 12.

FIG. 15 shows that said independent part 29 may have a 90° sidewards bent lobe having a round gap in a circle of approximately 90° to radially support the extension 25. On the opposite side of part 29 there may also be a similar lobe.

Figure 16:
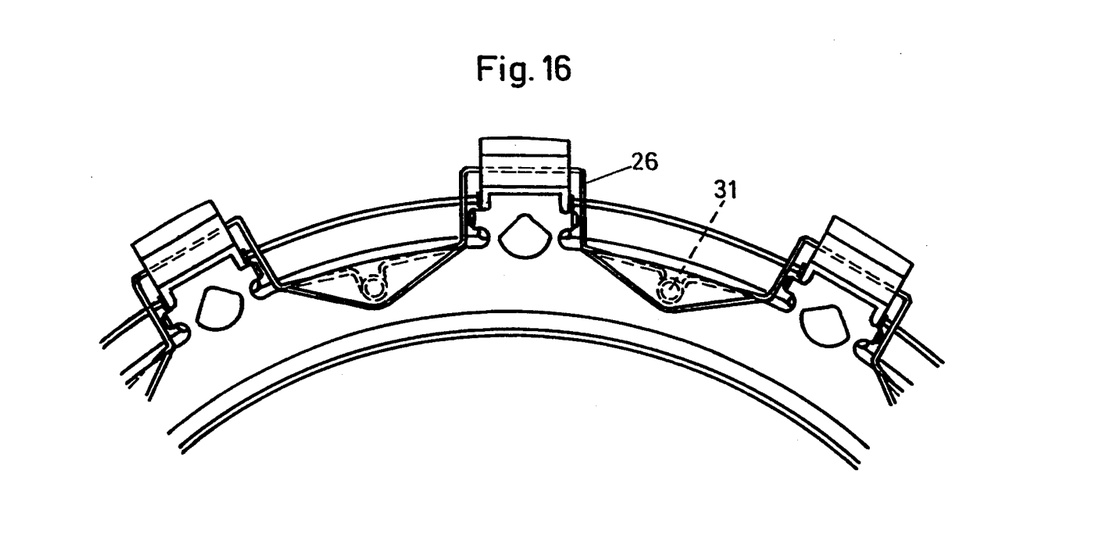
FIG. 16 is a partial representation of an embodiment of a lid rim, in which a spring is tensioned by means of a bolt.

FIG. 16 shows that the spring 26 may be kept under tension by the bolt 31.

Having described above the presently preferred embodiments of the present invention, it is to be understood that it may be otherwise embodied within the scope of the appended claims.

We claim:

1. Cooking vessel having a container and a lid comprising an inner lid part and an upper lid part, wherein the container includes a bent peripheral container rim and the lid includes at least three single lock elements peripherally arranged around the rim of the inner lid part which are swivellingly disposed and serve for locking the cooking vessel, wherein the rim area of the upper lid part is shaped to produce a swivel movement of the lock elements by pushing the upper lid part against them, and wherein the lock elements are supported at the outer rim of the inner lid part in such a way that said lock elements, in the swivel position corresponding to the closed state, press with ends from the outside against the container rim, and that in the swivel position corresponding to the open state, the ends of the lock-elements are at a distance from the container rim such that an unhindered lifting of the inner lid part from the container is possible, with the lock elements, in a cross section perpendicular to their axis of rotation, formed approximately C-shaped, but with an increasing wall width in the upper left-hand C-area and with a tapered hook-like part in the lower right-hand C-area.

2. The cooking vessel according to claim 1, wherein said lock element includes a bearing head in an end area of the increasing wall.

3. The cooking vessel according to claim 2, wherein said lock element includes at the outside an at least approximately flat part extending at least approximately to the bearing head.

4. The cooking vessel according to claim 2, wherein said lock element is provided with an outer border of the lower C-area in the form of a curve f which can be expressed in polar coordinates by the formula $f=F(r,w)$, wherein r is the distance of a point of the curve f from the theoretical axis of rotation and w is the angle which includes the distance straight line r with the horizontal x axis, such that, with the lock element in the closed position, the values of $r_1$ for $w_1 \approx 190°$ and $r_2$ for $w_2=225°$ are chosen in such a way that $r_1 < r_2$, and that the values of $r_3=270°$ and r4 for $w_4 \approx 300°$ are chosen in such a way that $r_3 \approx r_2$ and $r_4 < r_1$.

5. The cooking vessel according to claim 3, wherein at least in the area between the at least approximately flat part and an end of the hook-like part said lock element is formed in one piece.

6. The cooking vessel according to claim 5, wherein said lock element includes a projecting shoulder at the outside of the area between the at least approximately flat part and the end of the hook-like part.

7. The cooking vessel according to claim 6, wherein the outer rim of the inner lid part includes upwardly bent tongues forming an upper part of a bearing for the individual lock elements.

8. The cooking vessel according to claim 7, wherein at least one spring is provided which presses the lock elements from below upwards against the upper lid part.

9. The cooling vessel according to claim 8, wherein the outer lid part includes a lid knob which is boltable in the center by a bayonet catch.

10. The cooking vessel according to claim 9, wherein the lock elements include a depression in the area of an axis of rotation and having a width which is a little larger than the width of the tongue, so that the lock elements remain clamped by such tongues.

* * * * *

UNITED STATES PATENT AND TRADEMARK OFFICE
CERTIFICATE OF CORRECTION

PATENT NO. : 5,427,014
DATED : June 27, 1995
INVENTOR(S) : Reinhard von der Becke and Hans-Jurgen Beck It is certified that error appears in the above-indentified patent and that said Letters Patent is hereby corrected as shown below:

Abstract Line 6 "peripherically" should read --peripherally--.

Column 3 Line 24 "guaranties" should read --guarantees--.

Column 3 Line 49 before "stop." insert --the--.

Claim 4 Line 2 Column 6 "r4" should read --$r_4$--.

Signed and Sealed this

Seventeenth Day of October, 1995

Attest:

BRUCE LEHMAN

*Attesting Officer*          *Commissioner of Patents and Trademarks*